US009476750B2

(12) United States Patent
White et al.

(10) Patent No.: US 9,476,750 B2
(45) Date of Patent: Oct. 25, 2016

(54) METHOD AND APPARATUS FOR WATER LEVEL SENSING

(75) Inventors: Gerard Andrew White, Darlington (AU); Ze Kang Lai, Glenfield (AU)

(73) Assignee: BREVILLE PTY LTD, Alexandria, New South Wales (AU)

( * ) Notice: Subject to any disclaimer, the term of this patent is extended or adjusted under 35 U.S.C. 154(b) by 433 days.

(21) Appl. No.: 14/125,575

(22) PCT Filed: Jun. 29, 2012

(86) PCT No.: PCT/AU2012/000783
§ 371 (c)(1),
(2), (4) Date: Dec. 11, 2013

(87) PCT Pub. No.: WO2013/003891
PCT Pub. Date: Jan. 10, 2013

(65) Prior Publication Data
US 2014/0109667 A1    Apr. 24, 2014

(30) Foreign Application Priority Data
Jul. 1, 2011   (AU) .................................. 2011902615

(51) Int. Cl.
| | | |
|---|---|---|
| G01F 23/00 | (2006.01) | |
| A47J 31/44 | (2006.01) | |
| G01F 1/00 | (2006.01) | |
| G01F 15/075 | (2006.01) | |
| G01F 23/24 | (2006.01) | |
| G01F 23/26 | (2006.01) | |
| A47J 31/56 | (2006.01) | |

(52) U.S. Cl.
CPC ............ *G01F 23/00* (2013.01); *A47J 31/4457* (2013.01); *A47J 31/56* (2013.01); *G01F 1/007* (2013.01); *G01F 15/0755* (2013.01); *G01F 23/243* (2013.01); *G01F 23/263* (2013.01)

(58) Field of Classification Search
CPC .. G01F 1/007; G01F 15/0755; G01F 23/243; G01F 23/263; G01F 23/00; G01S 17/48; A47J 31/4457; A47J 31/56
See application file for complete search history.

(56) References Cited

U.S. PATENT DOCUMENTS

| | | | |
|---|---|---|---|
| 5,388,501 A * | 2/1995 | Hazan ................... | A47J 31/002 99/285 |
| 2008/0307975 A1* | 12/2008 | Kodden .............. | A47J 31/4457 99/280 |
| 2009/0205402 A1* | 8/2009 | Jackson .................. | G01F 1/007 73/1.73 |
| 2010/0206175 A1* | 8/2010 | White ................. | A47J 31/4457 99/280 |
| 2014/0069353 A1* | 3/2014 | Jimenez ................ | A47J 31/005 122/14.31 |

* cited by examiner

*Primary Examiner* — Francis Gray
(74) *Attorney, Agent, or Firm* — Michael Molins

(57) ABSTRACT

An apparatus and method of sensing fluid level in reservoir for calculating fluid flow there from. The method comprising the steps of: receiving a plurality of fluid level signals each indicative of respective fluid level state at a predetermined location within the reservoir; identifying change of a first fluid level state; recording a relative first time, with respect to fluid flow duration, at which the first fluid level state changed; and calculating fluid dispensed from the reservoir using the fluid flow duration and an average fluid flow rate associated with the respective fluid level location within the reservoir. The apparatus comprising: a plurality of fluid level probe elements located within the reservoir, each adapted to provide a respective fluid level signal; and a processor module adapted to receive receiving a plurality of fluid level signals.

17 Claims, 10 Drawing Sheets

METHOD AND APPARATUS FOR WATER LEVEL SENSING

FIELD OF THE INVENTION

The present invention relates to fluid level sensing and in particular to methods and apparatus for fluid level sensing in a domestic appliance.

The invention has been developed primarily as a method and apparatus to sense fluid level in a reservoir for calculating fluid flow there from, and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

Known devices for calculating or measuring fluid flow from a reservoir include inline calibrated flow meters. For consumer items, this method of measuring fluid flow typically does not satisfy cost constraints applied to respective designs.

There is a need in the art for an alternative method and apparatus in calculating fluid flow from a reservoir.

OBJECT OF THE INVENTION

It is an object of the present invention to overcome or ameliorate at least one of the disadvantages of the prior art, or to provide a useful alternative.

It is an object of the invention in its preferred form to provide a method and apparatus to sense fluid level in reservoir for calculating fluid flow there from.

SUMMARY OF THE INVENTION

According to an aspect of the invention there is provided a method of sensing fluid level in reservoir for calculating fluid flow there from, the method comprising the steps of:
  receiving a plurality of fluid level signals each indicative of respective fluid level state at a predetermined location within the reservoir;
  identifying change of a first fluid level state;
  recording a relative first time, with respect to fluid flow duration, at which the first fluid level state changed;
  calculating fluid dispensed from the reservoir using the fluid flow duration and an average fluid flow rate associated with the respective fluid level location within the reservoir.

According to an aspect of the invention there is provided a method of sensing fluid level in reservoir for calculating fluid flow there from, the method comprising the steps of:
  receiving a plurality of fluid level signals each indicative of respective fluid level state at a predetermined location within the reservoir;
  identifying change of a first fluid level state;
  recording a relative first time, with respect to fluid flow duration, at which the first fluid level state changed;
  identifying change of a second fluid level state;
  recording a relative second time, with respect to fluid flow duration, at which the second fluid level state changed;
  calculating average fluid flow rate from the reservoir using, at least, a known volume held by the reservoir between the change of the first fluid level state and the change of the second fluid level state and the fluid flow duration between the first time and the second time;
  associating the average fluid flow rate with the fluid level location within the reservoir.

Preferably, the average fluid flow rate being associated with the second fluid level location or state. Alternatively, the average fluid flow rate being associated with the first fluid level location or state. Most preferably, the average fluid flow rate being related to fluid flow while the level is between the first level location and the second fluid level location.

Preferably, the first fluid level state is indicative of a first predetermined location within the reservoir, and the second fluid level state is indicative of a second predetermined location within the reservoir. More preferably, the first predetermined location and second predetermined location are adjacent or neighbouring.

According to an aspect of the invention there is provided a method that includes the step of: receiving data indicative of a selected fluid volume. Preferably, the method includes the step of: calculating a primary flow time for delivering a selected fluid volume, the flow time being at least dependant on an average fluid flow rate. More preferably, the method includes calculating a compensated flow time, including any one or more of the following: preheat compensation time; ambient temperature compensation time; heater temperature compensation time; reservoir head compensation time; and mains input voltage compensation time. Most preferably, the selected fluid volume can be dispensed.

According to an aspect o the invention there is provided a method that includes the step of: receiving data indicative of a selected fluid volume. Preferably, the method include the step of: calculating a primary flow time for delivering a selected fluid volume, the flow time being at least dependant on an average fluid flow rate. More preferably, fluid volume dispensed can be calculated using flow time multiplied by a fluid flow rate. Most preferably, the selected fluid volume can be dispensed.

Preferably, a selected fluid volume can be dispensed using method steps of:
  multiplying an initial flow time by a fluid flow rate associated with the respective fluid level location within the reservoir to calculate an initial volume;
  multiplying a plurality of volume quantum corresponding to the distance between consecutive (or neighbouring) probe elements, the plurality of volume quantum added to the initial volume being less that of the selected fluid volume, the plurality of volume quantum added to the initial volume being subtracted from the selected fluid volume being a remainder volume less than one volume quantum, an intermediate flow time being the time duration for the plurality of fluid states to change;
  the final flow time, being a flow time from a final state change, is calculated from the remainder volume divided by a final average flow rate associated with the respective final fluid level location within the reservoir;
  the total flow time for dispensing a selected volume being the sum of the initial flow time, the intermediate flow time and final flow time.

Preferably, the reservoir has a constant cross section. The probe elements for producing the fluid level signals are preferably located (or distributed) uniformly through the depth of the reservoir. Most preferably, the distance between consecutive (or neighbouring) probe elements represents a volume quantum of 150 ml.

Preferably, the probe elements for producing the fluid level signals are located (or distributed) through the depth of the reservoir such that fluid level state changes with respect to a quantised representation of the reservoir volume. More preferably, the quantised representation of the reservoir volume is uniformly distributed between consecutive fluid level state changes. Most preferably, the uniformly distributed consecutive fluid level state changes define a constant volume quantum there between.

Preferably, each average flow rate is retained or stored (or accumulated or averaged). More preferably, each average flow rate is initialised and stored. Most preferably, each average flow rate is calculated or adaptively updated during use and stored. Alternatively, each average flow rate is initialised or pre calibrated and stored.

Preferably, the fluid is a liquid. Most preferably, the fluid is liquid water.

According to an aspect of the invention there is provided an apparatus for sensing fluid level in a reservoir to calculate fluid flow there from, the apparatus comprising:
 a plurality of fluid level probe elements located within the reservoir, each adapted to provide a respective fluid level signal; and
 a processor module adapted to receive receiving a plurality of fluid level signals; the processor module being adapted to perform a method as herein disclosed.

Preferably, the processor module being adapted to perform a method of sensing fluid level in reservoir for calculating fluid flow there from. More preferably, the processor module being adapted to calculate a flow time for dispensing a selected fluid volume from the reservoir. Most preferably, the processor module being adapted to dispense a selected fluid volume from the reservoir.

According to a further aspect of the invention there is provided a computer program product stored on a computer usable (or readable) medium, the computer program product for operation with a processor device and being adapted to provide a method of sensing fluid level in reservoir for calculating fluid flow there from as herein described. Preferably the computer usable (or readable) medium is non-transient. The computer usable (or readable) medium comprising computer code for executing a method as herein described. The computer program product comprising a computer readable program means for executing a method as herein described.

BRIEF DESCRIPTION OF THE DRAWINGS

A preferred embodiment of the invention will now be described, by way of example only, with reference to the accompanying drawings in which:

FIG. 9($b$) shows the device of FIG. 9($a$) with the draw tube partially withdrawn; and FIG. 9($c$) illustrates the device depicted in FIGS. 9($a$) and 9($b$) with the draw tube pivoted fully out of the removable reservoir.

PREFERRED EMBODIMENT OF THE INVENTION

Figure 1:
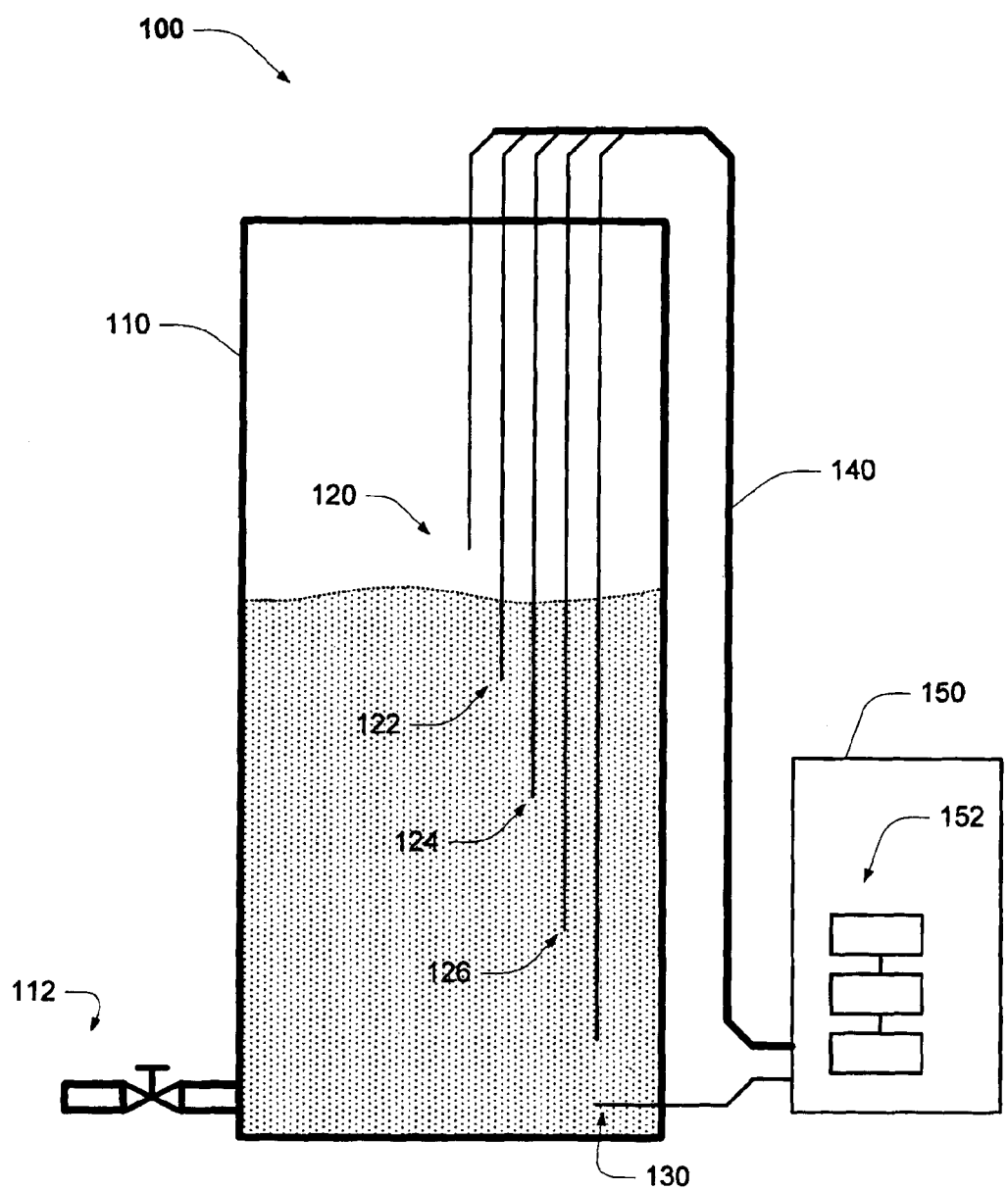
FIG. 1 is a schematic view of an embodiment apparatus for sensing fluid level in reservoir.

Referring initially to FIG. 1 of the drawings, an embodiment apparatus 100 is shown for sensing fluid level in reservoir 110.

The apparatus 100 is adapted for sensing fluid level in a reservoir 110 to calculate fluid flow there from 112. This apparatus comprises:
 a plurality of fluid level probe elements 120 (for example 122, 124, 126) located within the reservoir, each adapted to provide a respective fluid level signal (via 140), each fluid level signal being indicative of respective fluid level state at a predetermined location within the reservoir; and
 a processor module 150 adapted to receive receiving a plurality of fluid level signals; the processor module being adapted to perform a method 152 as herein disclosed.

In this embodiment, by way of example, a plurality of fluid level probe elements 120 (for example 122, 124,126) are each adapted to provide signals indicative of respective fluid level state at a predetermined location within the reservoir. In this embodiment, a common (or transmitter) probe element 130 provides a common source operatively associated with each fluid level probe element. A plurality of fluid level signals, each indicative of respective fluid level state at a predetermined location within the reservoir, are communicated (via a signal path 140) to, a processor module 150.

The processor module 150 being adapted to identify a change in a first fluid level state and recording a relative first time, with respect to fluid flow duration, at which the first fluid level state changed. The processor module being further adapted to calculate an average fluid flow rate from the reservoir using the fluid flow duration and the first time.

The processor module being further adapted to calculate an average fluid flow rate from the reservoir using the fluid flow duration and a pair of times indicating respective change of fluid level state at distinct predetermined locations within the reservoir. The processor module being further adapted to calculate fluid dispensed from the reservoir using the fluid flow duration and, by way of example at least, an average fluid flow rate associated with the respective fluid level location within the reservoir.

It will be appreciated that by extending the probe elements downward, into the reservoir, the full extent of the probe element can be used to sense the presence of the fluid, thereby sensing whether (or not) the fluid is at least at (or above) the end extremity of the probe element.

By way of example only, the reservoir has a constant cross section. The probe elements for producing the fluid level signals are located (or distributed) uniformly through the depth of the reservoir, such that the distance between consecutive probe elements represents a respective volume there between of 150 mL.

In an embodiment, probe elements for producing the fluid level signals are located (or distributed) through the depth of the reservoir. The distance between consecutive probe element can represent a constant volume quantum, such as 150 ml. By way of example only, an assembly can include a plurality of probe elements—including one common (transmitter) probe element and at least one active (receiver) probe elements.

In this embodiment apparatus 100, thirteen active (receiver) probe elements are spaced in the reservoir at heights corresponding to 150 ml intervals starting from 0 through to 1800 ml. As the fluid level passes between two probe elements a relative time is monitored and stored. This relative time duration can be used to calculate an average flow rate between the two probe elements (typically consecutive probe elements). Each instance where fluid passes between the same pair of probe elements, the previous timing data and/or average flow rate data can be overwritten.

A method of controlling fluid volume dispensed by an apparatus can includes observing the time taken by the apparatus (pump) to dispense a known volume of fluid from a reservoir, having a particular fluid head height. This timing data can be used to determine the required flow time that the pump needs to dispense a selected fluid volume. By way of example only, the pump can be a vapour lift pump.

The volume dispensed can be user selected, or can be automatically selected. Automatic selection can be based on the capacity of fluid receptacle located for receiving the fluid, as detected by the apparatus. Typically the fluid is a relatively electrically conductive fluid, such as drinking (or potable) water.

In an example embodiment, the apparatus 100 is adapted to deliver a fluid having a selected volume (for example a cup—selected_volume).

The apparatus can retrieve an average flow rate for the starting reservoir level. A timer can continue to maintain an initial flow time with respect to a relative start time, the processor element identifies the relative time (or flow duration) as the fluid level passes below the next probe element. For example this flow duration is determined as initial_probe_time seconds. The processor can calculate the fluid volume delivered, on the basis of a previously recorded flow rate initial_flow_rate, as (initial_probe_time×initial_flow_rate at a specific fluid level).

The processor can then calculate how many more probe elements need to be passed (for example having an incremental volume of 150 ml).

Any residual volume required to complete the selected (or required) volume to be delivered can then be calculated. The residual volume (residual_volume) being the required volume less the volume dispensed reaching the initial probe element and less any discrete probe element volume quantum (discrete_probe_volume), can be expressed as represented in the equation below.

residual_volume=selected_volume−(initial_flow_rate×initial_probe_time)−(N×discrete_probe_volume)

The residual flow duration (residual_probe_time) for dispensing the residual volume, can be expressed as represented in the equation below.

residual_probe_time=residual_volume/residual_flow_rate

The flow duration can then be established (or calculated)

flow_duration=initial_probe_time+discrete_probe_time+residual_probe_time

It will be appreciated that, in this embodiment, the times initial_probe_time and discrete_probe_time are typically measured, while residual_probe_time is typically a controlled duration parameter. Typically the smallest selectable disposed volume is greater then the volume quantum represented by consecutive probe elements.

Figure 2:
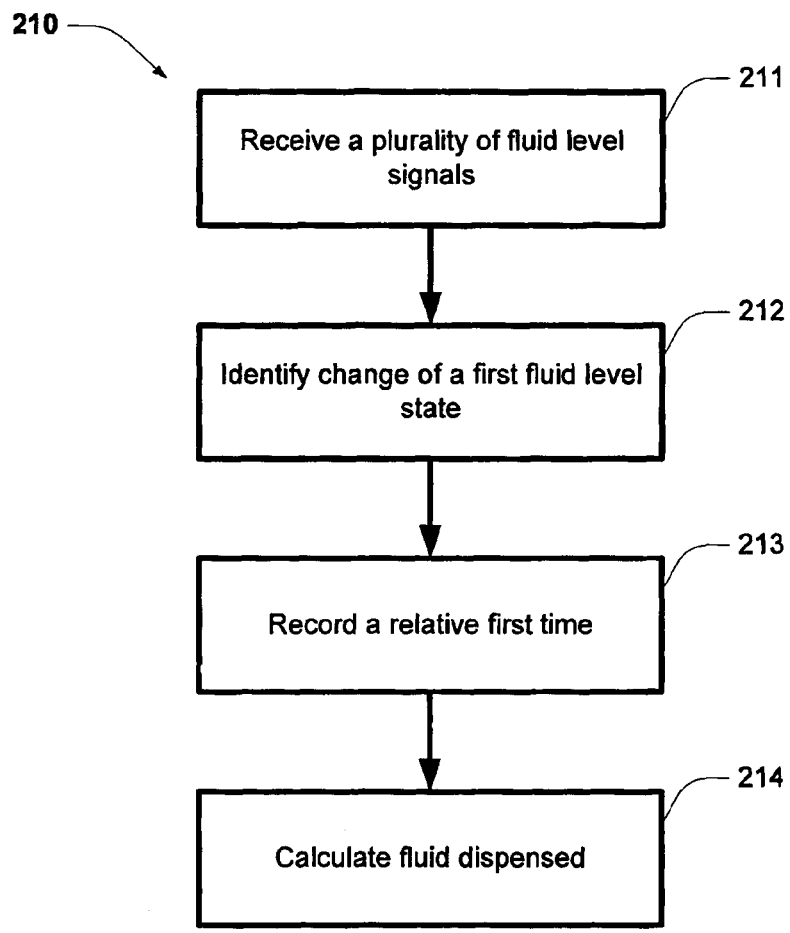
FIG. 2A is a flow diagram for an embodiment method of sensing fluid level in reservoir.
FIG. 2B is a flow diagram for an embodiment method of sensing fluid level in reservoir.

Referring to FIG. 2, a flow chart of an embodiment method 210 of sensing fluid level in reservoir for calculating fluid flow there from. The method comprising the steps of:
STEP 211: receiving a plurality of fluid level signals each indicative of respective fluid level state at a predetermined location within the reservoir;
STEP 212: identifying change of a first fluid level state;
STEP 213: recording a relative first time, with respect to fluid flow duration, at which the first fluid level state changed;
STEP 214: calculating fluid dispensed from the reservoir using the fluid flow duration and an average fluid flow rate associated with the respective fluid level location within the reservoir.

Figure 2B:
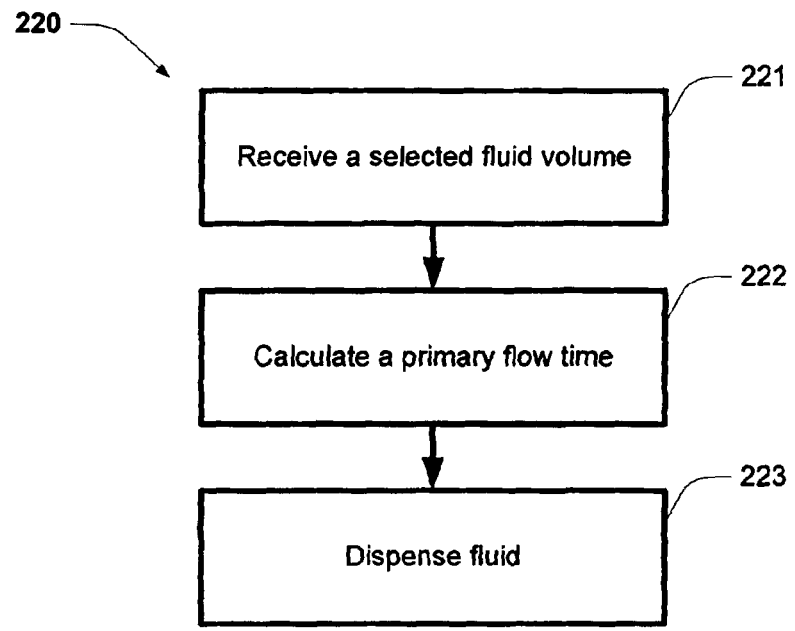

Referring to FIG. 2B, a flow chart of an embodiment method 220 of sensing fluid level in reservoir for calculating fluid flow there from. The method comprising the steps of:
STEP 221: receiving data indicative of a selected fluid volume;
STEP 222: calculating a primary flow time for delivering a selected fluid volume, the flow time be at least dependant on an average fluid flow rate;
STEP 223: controlling the fluid volume dispensed.

In an embodiment, the fluid volume dispensed can be calculated and/or controlled using method steps of:
multiplying an initial flow time by a fluid flow rate associated with a respective fluid level location within the reservoir to calculate an initial volume;
multiplying a plurality of volume quantum corresponding to the distance between consecutive (or neighbouring) probe elements, the plurality of volume quantum added to the initial volume being less that of the selected fluid volume, the plurality of volume quantum added to the initial volume being subtracted from the selected fluid volume being a remainder volume less then one volume quantum, an intermediate flow time being the time duration for the plurality of fluid states to change;
the final flow time, being a flow time from a final state change, is calculated from the remainder volume divided by a final average flow rate associated with the respective final fluid level location within the reservoir;
the total flow time for dispensing a selected volume being the sum of the initial flow time, the intermediate flow time and final flow time.

Figure 3A:
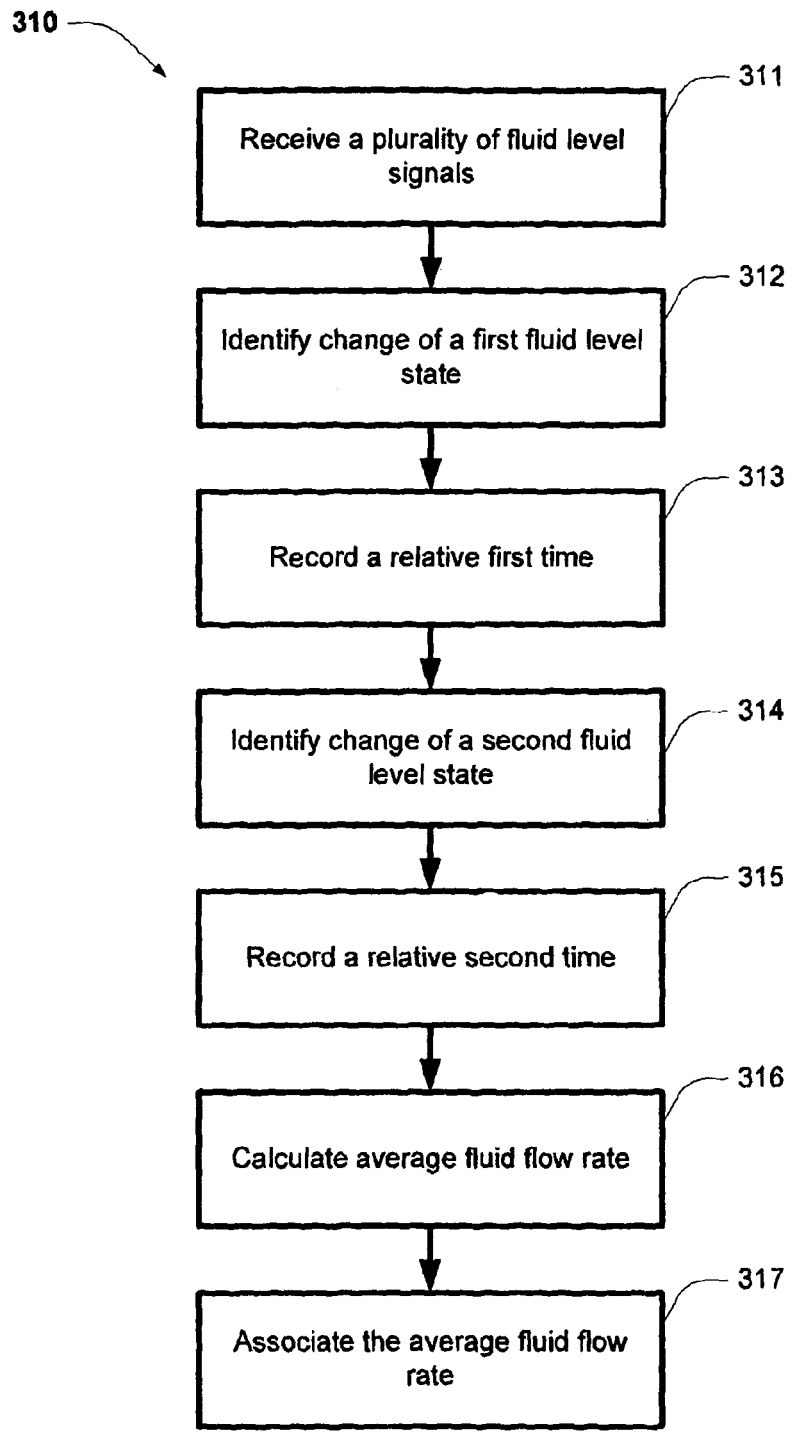
FIG. 3 is a flow diagram for an embodiment method of sensing fluid level in reservoir.

Referring to FIG. 3, a flow chart of an embodiment method 220 of sensing fluid level in reservoir for calculating fluid flow there from. The method comprising the steps of:
STEP 311: receiving a plurality of fluid level signals each indicative of respective fluid level state at a predetermined location within the reservoir;
STEP 312: identifying change of a first fluid level state;
STEP 313: recording a relative first time, with respect to fluid flow duration, at which the first fluid level state changed;
STEP 314: identifying change of a second fluid level state;
STEP 315: recording a relative second time, with respect to fluid flow duration, at which the second fluid level state changed;
STEP 316: calculating average fluid flow rate from the reservoir using, at least, a known volume held by the reservoir between the change of the first fluid level state and the change of the second fluid level state and the fluid flow duration between the first time and the second time;

STEP 317: associating the average fluid flow rate with the fluid level location within the reservoir.

In an embodiment, the average fluid flow rate being associated with the second fluid level location or state. Alternatively, the average fluid flow rate being associated with the first fluid level location or state. The average fluid flow rate is related to fluid flow while the level is between the first level location and the second fluid level location.

The first fluid level state can be indicative of a first predetermined location within the reservoir, and the second fluid level state is indicative of a second predetermined location within the reservoir, wherein the first predetermined location and second predetermined location are adjacent or neighbouring.

In an embodiment, the reservoir has a constant cross section, and the probe elements are located (or distributed) uniformly through the depth of the reservoir, wherein the distance between consecutive (or neighbouring) probe elements represents a known volume quantum (such as 150 ml).

In an embodiment, an average flow rate is pre initialised and stored. Each calculated average flow rate is typically retained or stored (or accumulated or averaged), wherein each average flow rate is calculated or adaptively updated during use and stored.

Figure 7:
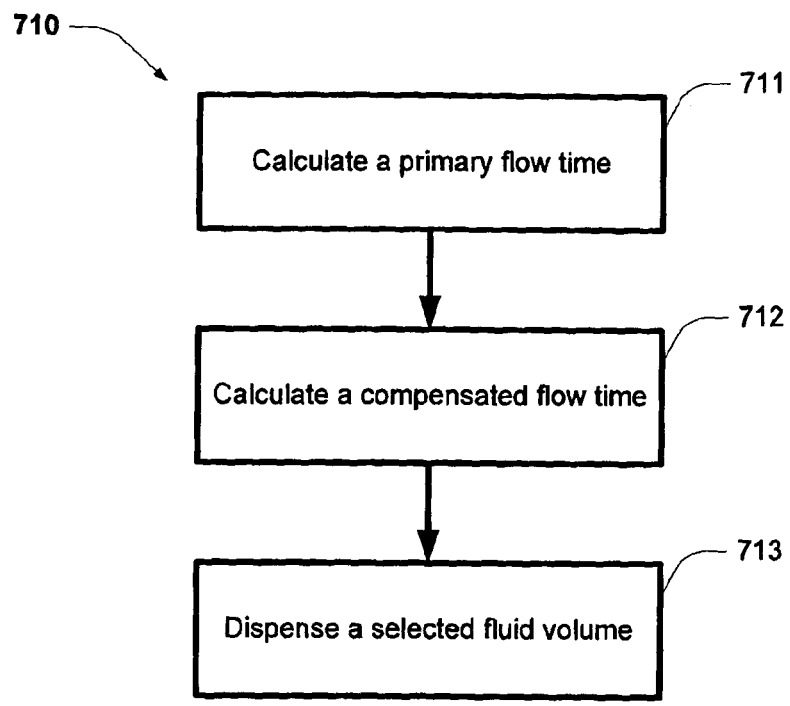
FIG. 7 is a flow diagram for an embodiment method of sensing fluid level in reservoir.

Alternatively, as best shown in FIG. 7, a method can calculate fluid flow or dispensed fluid volume, as a compensated_volume_flow_time. This compensated_volume_flow_time can include: compensated_volume_flow_time being a predetermined selected_volume_flow_time+preheat_compensation_time+ambient_temperature_compensation_time+heater_temperature_compensation_time+reservoir_head_compensation_time+input_voltage_compensation_time.

Figure 4:
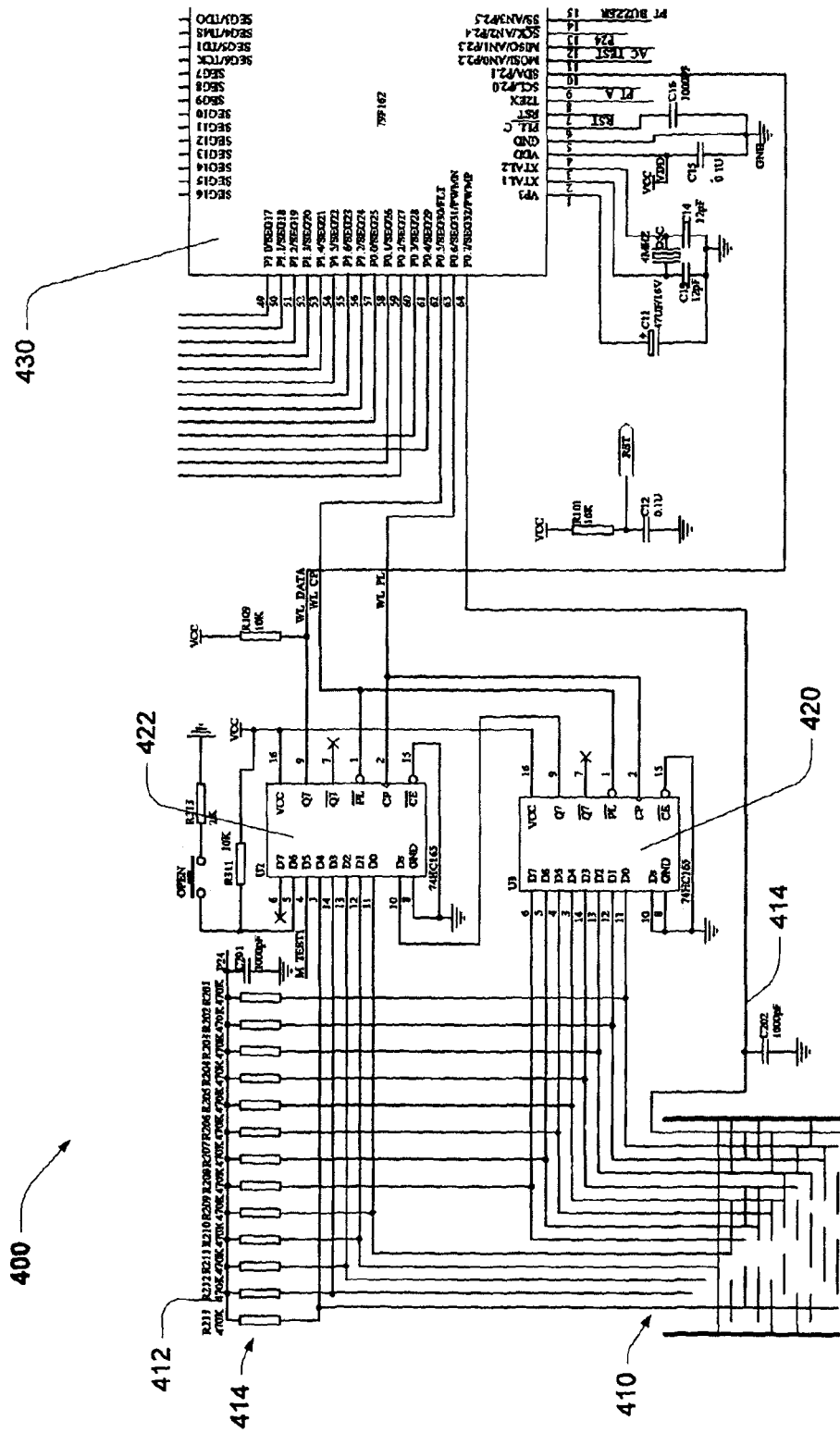
FIG. 4 is a partial schematic circuit diagram of an embodiment apparatus for sensing fluid level in reservoir.

FIG. 4 shows an embodiment schematic circuit diagram for an apparatus 400 that senses fluid level in reservoir for calculating fluid flow there from. This embodiment requires that the fluid is appropriately electrically conductive, such as potable water.

In this embodiment, the circuit includes a plurality of probe elements 410. Each probe elements is coupled to a voltage potential at 412 through a respective one of a plurality of pull-up resistors 414. The probe elements are operatively associated with a common probe element 416.

In this embodiment, the circuit includes one or more registers 420,422 (for example 74HC165 8 Bit COMS shift out register) having a high impedance voltage input, such that when Vin<2.1V the signal is interpreted as low input and when Vin>2.4V the signal is interpreted as high input. It would be understood that inputs can be read/retrieved by providing clock pulse through an output pin as a series pulse reading.

With a voltage potential coupled (for example via a micro-controller) to each of the probe elements:
  if fluid is in contact with a probe element, the fluid makes a connection between the level sensing probe element and common probe element (typically grounded), thereby applying a respective level signal to the registers below 2.1V, which is interpreted as a low signal; and
  if there is no fluid in contact with a probe element, a respective level signal is pulled high (for example about 5V), thereby applying a respective level signal to the registers above 2.4V, which is interpreted as a high signal.

To restrict corrosion of the probe elements, the voltage potential at 412 and the ground connection of 414 is applied only for limited time periods for (or when) making measurements. In an attempt to discharge/dislodge particles coupled to the probe elements, the polarity to the prove element voltage supplies are temporarily reversed (preferably applying each polarity for a similar time period). In this embodiment, the voltage potential is provided from an output pin of a processor element 430.

In this example embodiment, two shift registers are used for identifying twelve fluid levels, a dry reservoir. The processor element 430 reads/retrieves the signal from each register 420,422 in a conventional manner. The processor element being adapted to dispense a fluid from a reservoir according to a method as herein described.

Figure 5:
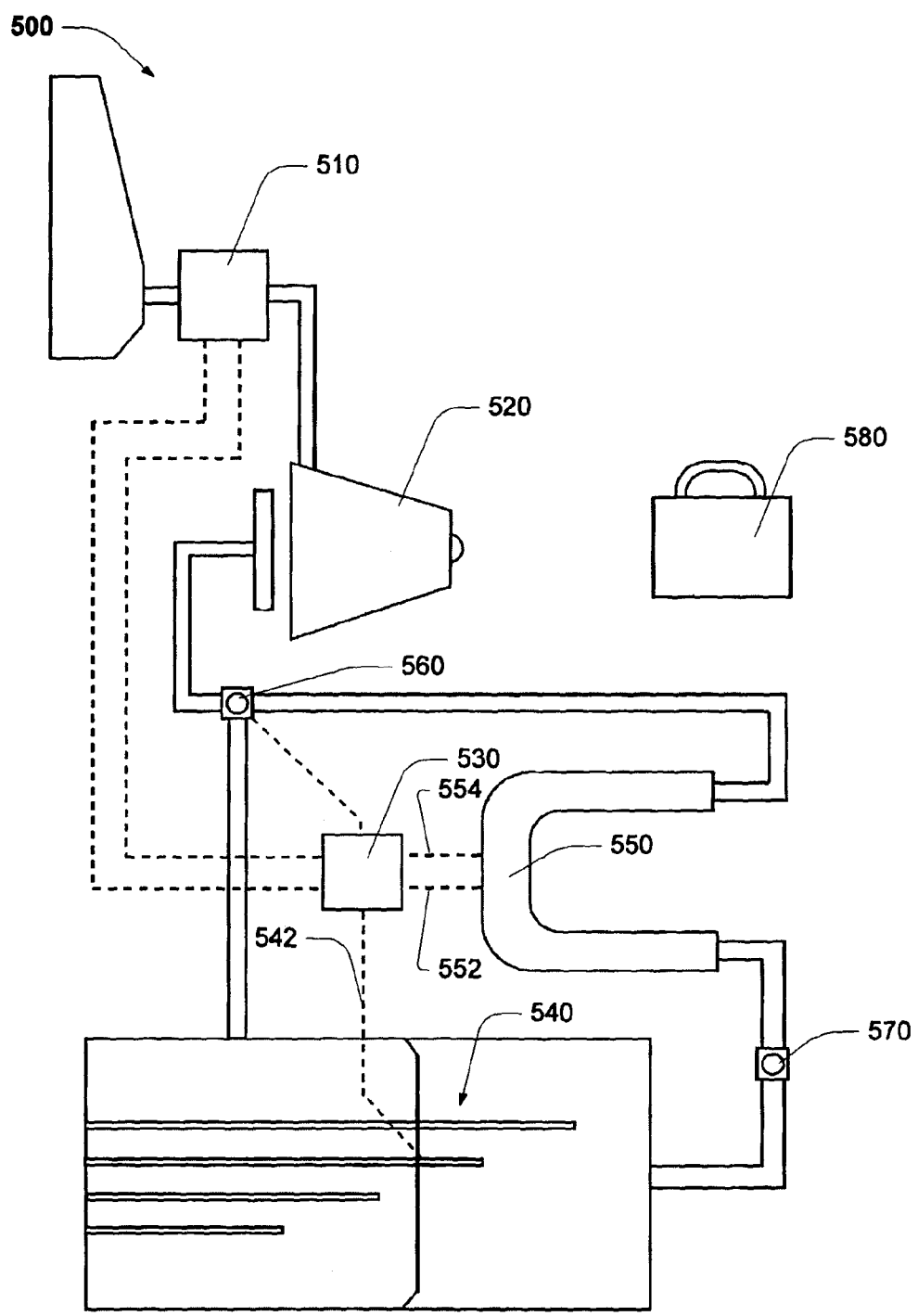
FIG. 5 is a schematic diagram of an embodiment apparatus for sensing fluid level in reservoir.
Figure 6:
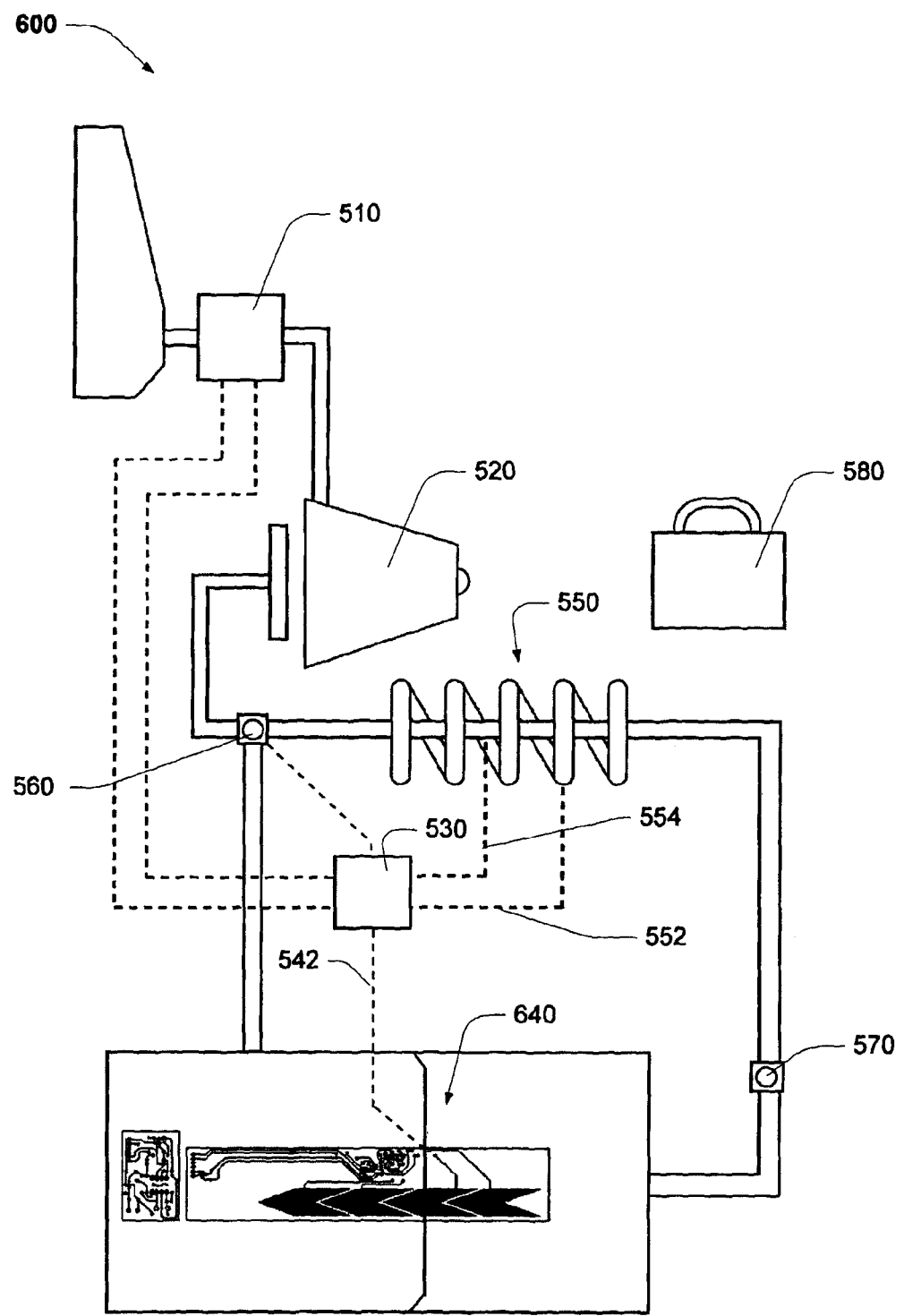
FIG. 6 is a schematic diagram of an embodiment apparatus for sensing fluid level in reservoir.

FIG. 5 and FIG. 6 each show a schematic diagram of a respective embodiment beverage making apparatus (500, 600) that senses fluid level in a reservoir. These embodiments include:
  a grinder 510 speed is measured for recording by the processor (or controller) module to determine the real time rpm;
  a steep release brew chamber 520 coupled to receive grinds from the grinder;
  a processor (or controller) module 530 being adapted to use one or more of the identified variables to determine the actuation of the recycle valve;
  a plurality of fluid level probe elements 540 used to sense fluid level in a reservoir to determine head height, wherein reservoir level sensing (via 542) is identified by determining the rate of change of the head height in ml/sec by the microcontroller;
  one or more flow-through fluid heater module 550, typically with embedded element, wherein fluid temperature of the flow through element is measured (via 552) and recorded by the processor element, and power input is measured and recorded (via 554) by the processor element;
  a recycle valve 560 controlled by the processor element to inhibit or allow a determined fluid temperature within the riser to pass towards the brew chamber or reservoir;
  a valve 570 allows or restricts fluid from progressing to the heater; and
  a receptacle 580 receives a user selected volume, delivered at a relatively accurate (and/or consistent) predetermined temperature and extraction strength.

FIG. 6 shows schematic view of an embodiment apparatus 600 using capacitance level sensing 640 and an element wrapped riser.

Referring to FIG. 7, a method 710 can calculate fluid flow or dispensed fluid volume, as a compensated_volume_flow_time.

This compensated_volume_flow_time can include: compensated_volume_flow_time being a predetermined selected_volume_flow_time+preheat_compensation_time+ambient_temperature_compensation_time+heater_temperature_compensation_time+reservoir_head_compensation_time+input_voltage_compensation_time.

A method 710 can, by way of example, includes the steps of:
  STEP 711: calculating a primary flow time for delivering a selected fluid volume, the flow time being at least dependant on an average fluid flow rate;

STEP 712: calculating a compensated flow time, including any one or more of the following: preheat compensation time; ambient temperature compensation time; heater temperature compensation time; reservoir head compensation time; and mains input voltage compensation time; and STEP 713: dispensing the selected fluid volume.

Figure 8:
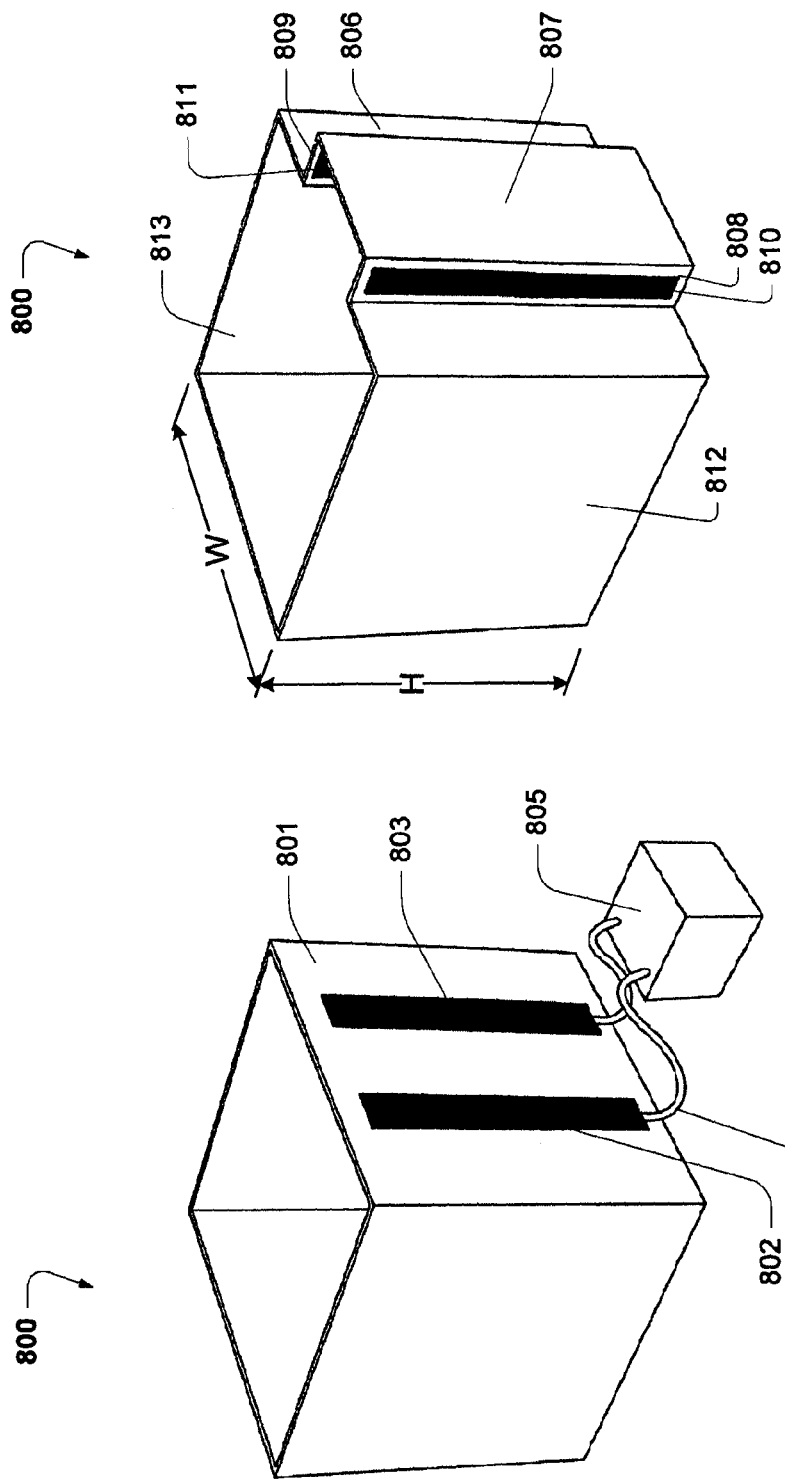
FIG. 8 is a perspective view of a fluid reservoir with capacitive level sensing.

As shown in FIG. 8, a removable reservoir 800 has at least one flat side 801. Parallel capacitive strips 802, 803 may be adhered or otherwise incorporated onto the interior surface of a flat side 801 of the reservoir 800. The reservoir 800 is thus compatible with any of the aforementioned examples and technology. As the water level inside the reservoir 800 changes, the capacitance between the strips 802, 803 also changes. These changes are transmitted by electrical leads 804 to the appropriate terminal, signal processor device or microprocessor 805. In some embodiments, one wall 806 of a removable reservoir 800 incorporates a pocket or recessed portion 807 that extends substantially the full useful "H" height of the removable reservoir 800. In this example, the reservoir 800 has a generally rectangular cross section and the recess 807 is also rectangular, in cross section. The recess 807 has spaced apart but parallel sides 808, 809. The interior surfaces of the spaced apart and preferably parallel sides 808, 809 have conductive, capacitive strips 810, 811 adhered, affixed or otherwise incorporated onto them. According, the recess 807 allows the flat surfaces of the conductive strips 810, 811 to face one another and to be spaced apart by a distance that is less than the affective "W" width of the reservoir 800. In preferred embodiment the recess 807 is centrally located between the opposing walls 812, 813 that are adjacent to the side 806 that incorporates the recess 807. This locates the vertical centre line of the recess 87 approximately mid way along the effective width of the removable reservoir.

Figure 9A:
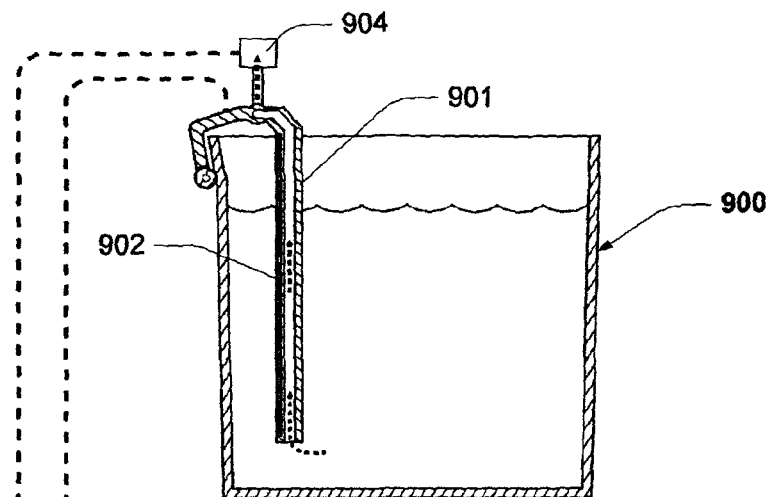
FIG. 9($a$) is a side elevation of a removable reservoir with pivoting draw tube that incorporates a capacitive level sensor.
Figure 9B:
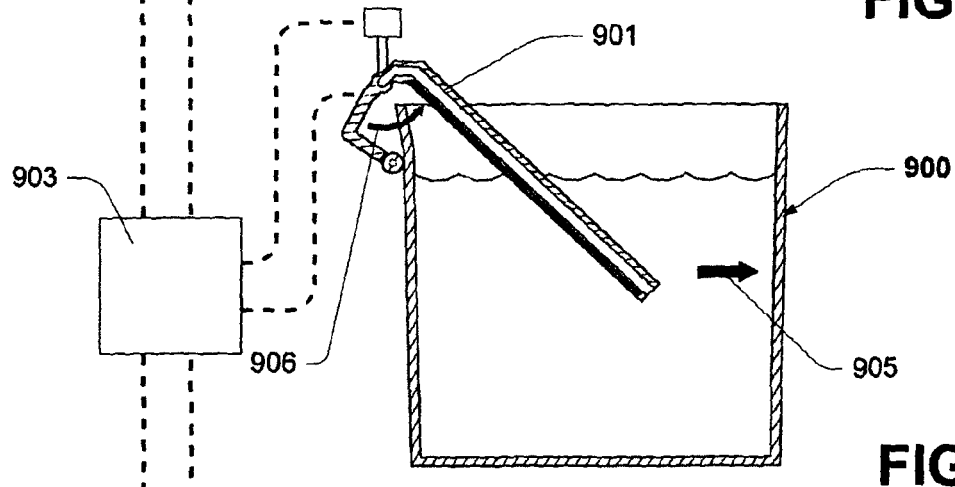
Figure 9C:
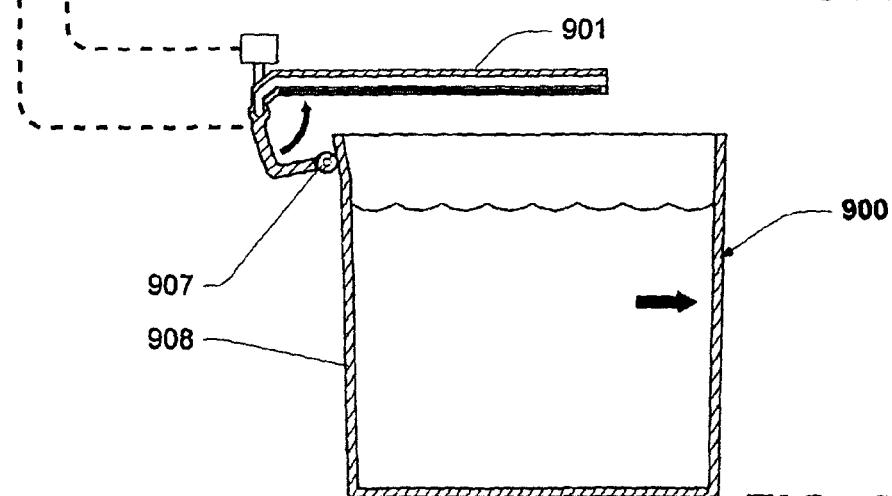

As shown in FIG. 9, a removable reservoir 900 may be associated with a draw tube or liquid conveyor tube 901 that pivots into and out of position. As shown in FIG. 9(*a*) the draw tube 901 is vertical when the reservoir is installed and ready to use. The draw tube or conveyor 901 incorporates, along its length, a level sensing device such as a capacitive strip arrangement 902 that provides an electric signal to a signal processor or micro processor 903. In this way, the vertical draw tube 902 provides information to a beverage making device about not only the presence of liquid in the reservoir 900 but also the level of the liquid in the reservoir. The draw tube 901 is also used by the device's pump apparatus 904 for drawing liquid from the reservoir 900 used by the machine into which it is incorporated. As shown in FIGS. 9(*b*) and (*c*) removing the reservoir 905 causes or allows the draw tube 901 to pivot 906 to a horizontal position. In this example, the pivot point is external to the reservoir 900. As shown in FIG. 9(*c*), the pivoting draw tube 901 is completely removed from the reservoir so that the reservoir can be removed from the device into which it is installed. The draw tube assembly may incorporate a bumper 907 that makes contact with and is guided by an external surface 908 of the reservoir. In this way, re-inserting the reservoir causes the surface 908 to contact the bumper 907 and thus urge pivot or rotate the draw tube 901 into a more vertical orientation. The tube eventually comes to rest in a fully vertical orientation as suggested by FIGS. 9(*b*) and 9(*a*).

It will be appreciated that the illustrated embodiments disclose one or more methods and apparatus for sensing fluid level in reservoir to calculating fluid flow there from.

It would be appreciated that, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment.

Thus, one embodiment of each of the methods described herein is in the form of a computer-readable carrier medium carrying a set of instructions, e.g., a computer program that are for execution on one or more processors.

Unless specifically stated otherwise, as apparent from the following discussions, it is appreciated that throughout the specification discussions utilizing terms such as "processing", "computing", "calculating", "determining" or the like, can refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken is included.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Similarly, it is to be noticed that the term "coupled", when used in the claims, should not be interpreted as being limitative to direct connections only. The terms "coupled" and "connected", along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may refer to the same embodiment. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description. Although the invention has been described with reference to specific examples, it will be appreciated by those skilled in the art that the invention may be embodied in many other forms.

It will be appreciated that an embodiment of the invention can consist essentially of features disclosed herein. Alternatively, an embodiment of the invention can consist of features disclosed herein. The invention illustratively disclosed herein suitably may be practiced in the absence of any element which is not specifically disclosed herein.

The claims defining the invention are as follows:

1. A water sensing apparatus for a removeable reservoir, the apparatus including:
   a liquid conveyor tube that pivots between a raised configuration and a lowered configuration;
   a level sensing device being a capacitive strip is installed along the length of the liquid conveyor tube;
   a processor module is coupled to the level sensing device for receiving a signal indicative of a water level in the removeable reservoir;
   wherein, with liquid conveyor tube in the lowered configuration, the level sensing device provides a signal indicative of a water level in the reservoir, and wherein the liquid conveyor tube is pivoted to a raised configuration when removing the reservoir.

2. The apparatus according to claim 1, the apparatus including a pump device in fluid communication with the liquid conveyor tube for drawing liquid there through from the reservoir.

3. The apparatus according to claim 1, wherein the liquid conveyor tube is removed from the reservoir when in the raised configuration.

4. The apparatus according to claim 3, wherein the liquid conveyor tube is substantially horizontal when in the raised configuration.

5. The apparatus according to claim 3 wherein the pivot of the liquid conveyor tube is external to the reservoir.

6. The apparatus according to claim 3, the apparatus comprising a bumper element rigidly coupled to the liquid conveyor tube; wherein the bumper element makes contact with, and is guided by, an external surface of the reservoir.

7. The apparatus according to claim 6, wherein during re-insertion of the reservoir, the external surface of the reservoir contacts the bumper element that rotates the liquid conveyor tube into the lowered configuration.

8. The apparatus according to claim 7, wherein the reservoir has a constant cross section.

9. A method of sensing water level in reservoir for calculating water flow there from, using an apparatus according to claim 1, the method comprising the steps of:
   receiving a plurality of water level signals each indicative of respective water level state at a predetermined location within the reservoir;
   identifying change of a first water level state;
   recording a relative first time, with respect to water flow duration, at which the first water level state changed;
   identifying change of a second water level state;
   recording a relative second time, with respect to water flow duration at which the second water level state changed;
   calculating average water flow rate from the reservoir using a known volume held by the reservoir between the change of the first water level state and the change of the second water level state and the water flow duration between the first time and the second time; and
   associating the average water flow rate with a water level location within the reservoir.

10. The method according to claim 9, wherein an average water flow rate is associated with the second water level location.

11. The method according to claim 9, wherein an average water flow rate is associated with the first water level location.

12. The method according to claim 9, wherein the average water flow rate is related to water flow while the level is between the first level location and the second water level location.

13. The method according to claim 9, wherein the first water level state is indicative of a first predetermined location within the reservoir, and the second water level state is indicative of a second predetermined location within the reservoir.

14. The method according to claim 13, wherein the first predetermined location and second predetermined location are neighbouring predetermined locations.

15. The method according to claim 13, the method including the step of:

receiving data indicative of a selected water volume; and
dispensing the selected water volume.

16. The method according to claim 15, the method including the step of:
   calculating a primary flow time for delivering a selected water volume, the flow time is dependant on an average water flow rate.

17. The method according to claim 15, the method including the step of:
   calculating a compensated flow time using any one or more of the following:
   preheat compensation time; ambient temperature compensation time; heater temperature compensation time; reservoir head compensation time; and mains input voltage compensation time; and
   wherein the water volume dispensed can be calculated using flow time multiplied by a water flow rate.

* * * * *